July 6, 1954  K. R. LARSON  2,682,796
PREDETERMINED TORQUE RELEASE AND TORQUE INDICATING WRENCH
Filed Sept. 23, 1949  3 Sheets-Sheet 2
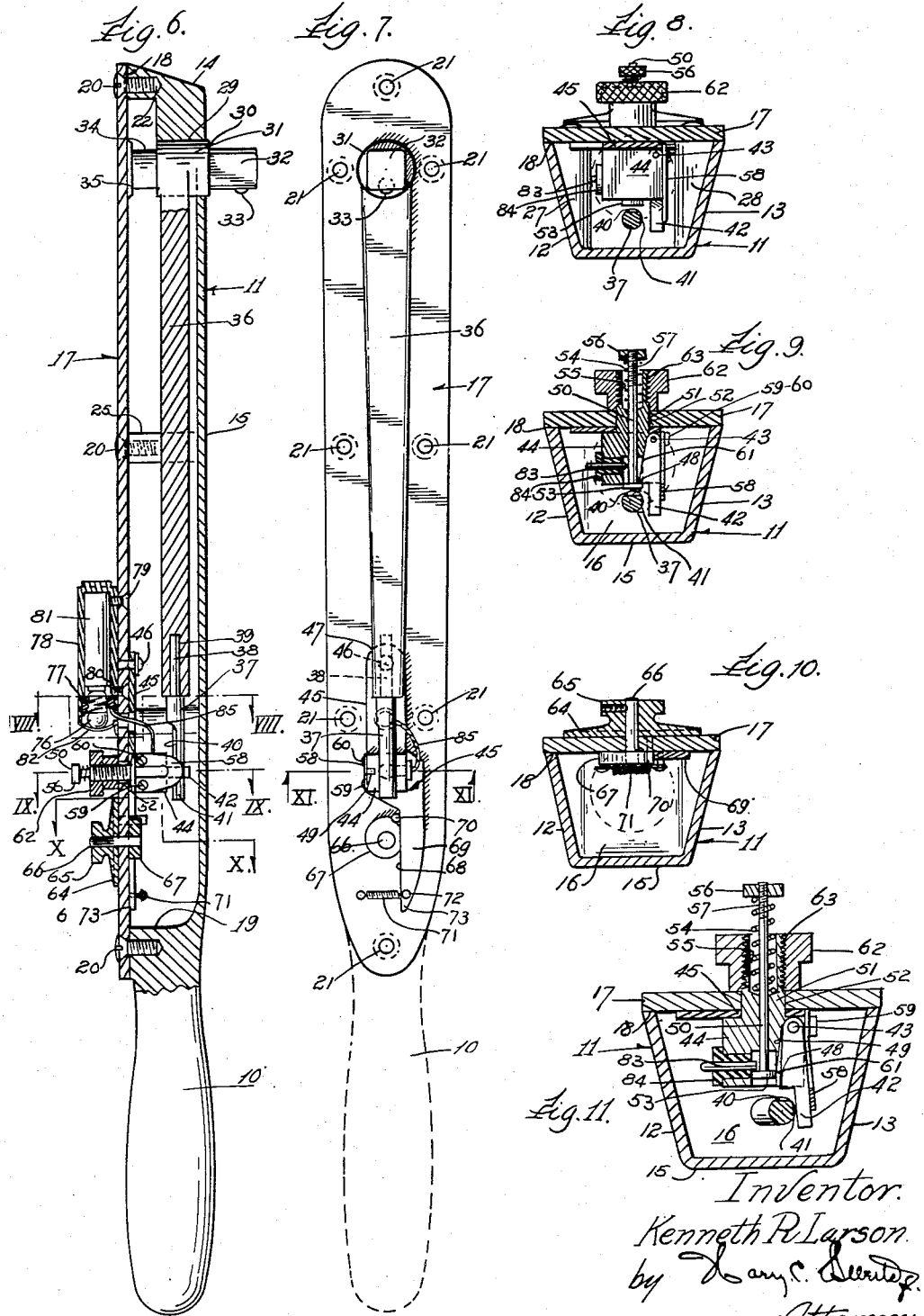
Inventor.
Kenneth R Larson
by
Attorney.

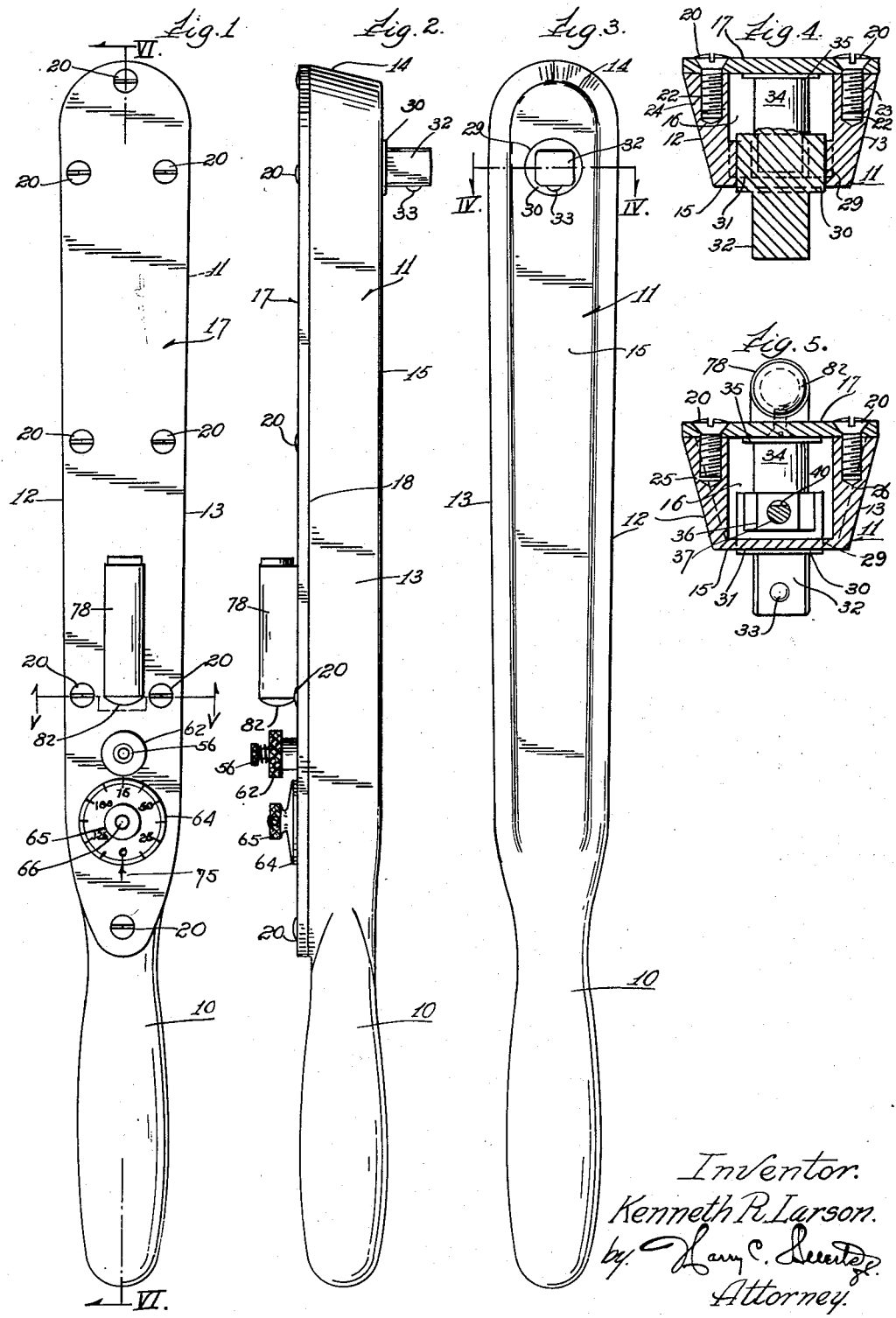

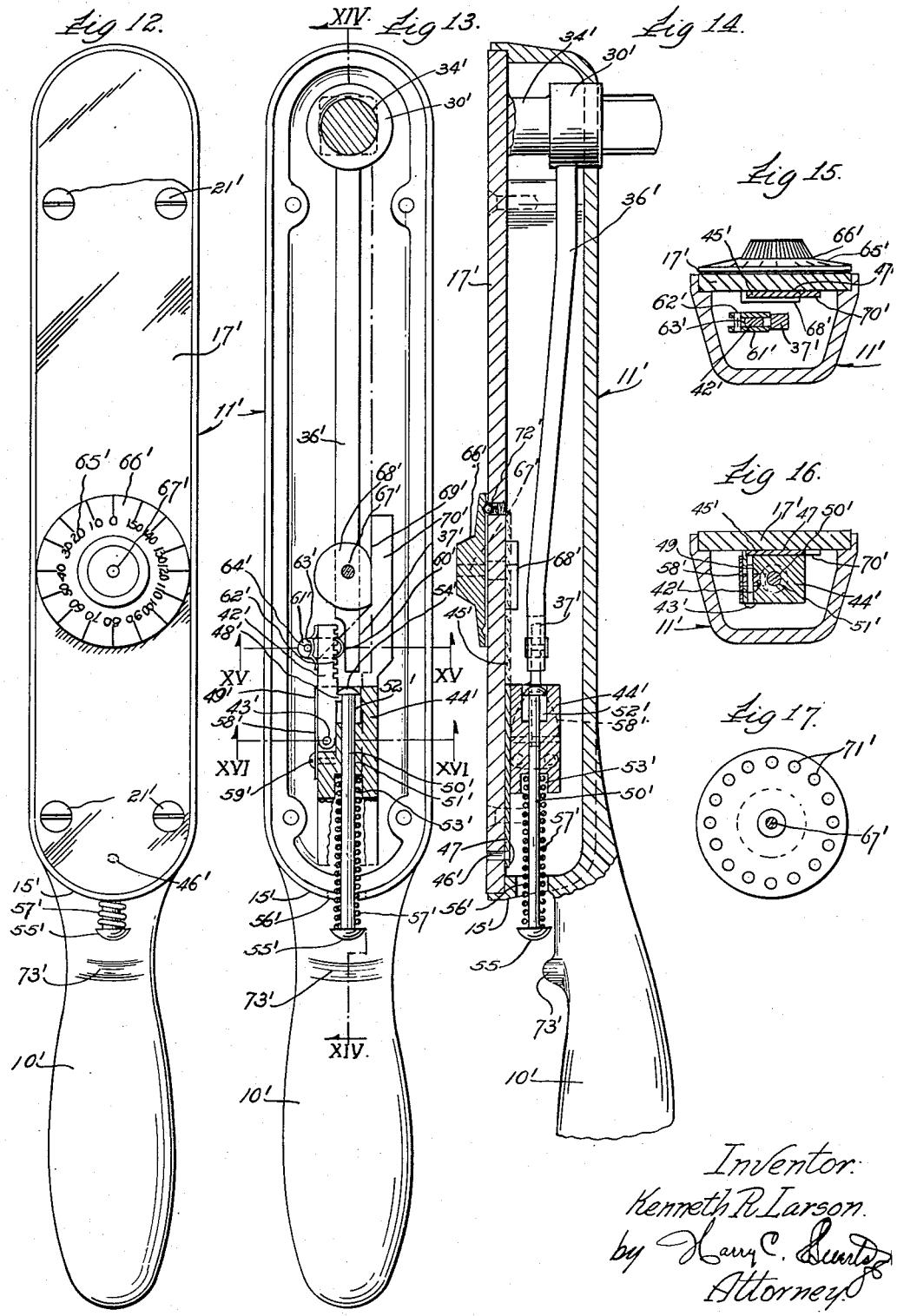

Patented July 6, 1954

2,682,796

UNITED STATES PATENT OFFICE 2,682,796

PREDETERMINED TORQUE RELEASE AND TORQUE INDICATING WRENCH

Kenneth R. Larson, Des Plaines, Ill., assignor to Snap-On Tools Corporation, a corporation of Delaware Application September 23, 1949, Serial No. 117,327

17 Claims. (Cl. 81—52.5)

This invention relates to turning devices and more particularly to torque measuring wrenches of the type illustrated in United States Letters Patent No. 2,312,104 issued February 23, 1943, although certain features thereof may be employed with equal advantage for other purposes.

It contemplates more especially the provision of a simple, dependable, accurate and compact torque measuring wrench that accurately designates the pre-set force to be applied in nut turning and similar movements under all conditions.

Most torque wrenches measure the flex in a beam which resists the turning force of a wrench in order to measure the amount of torque or force applied in nut turning and similar operations. Then, too, the amount of torque has been measured by determining the degree of twist in a shank or shaft. While some torque wrenches have embodied this principle and an appreciable effort recently has been successfully made to adapt such to commercial wrench structures of the conventional handle or lever arm type as evidenced by the aforementioned Letters Patent No. 2,312,104, it is now deemed more effective to pre-set a wrench of the type so that the desired nut or other fastener tightening load will be indicated during use to preclude further tightening thereof. The desirability of utilizing the degree of twist in the shank or shaft as the measuring expedient in nut turning and similar operations, has been resorted to with success from the standpoint of translating the degree of twist to an indicator at a point of maximum displacement so that accurate measurements can be recorded by reducing the error factor to a minimum as illustrated in the above referred to Letters Patent; however, it is now known that predetermined tightening loads can be imparted to fasteners by incorporating presetting control instrumentalities to preclude variations in fastener turning loads without jarring the sensitive measuring elements thereof.

The importance of accuracy in torque wrenches cannot be over-emphasized, and the degree of accuracy depending largely upon the elimination of or substantial reduction in friction, lag and free-play between relatively moving parts. This is also important in torque wrenches that embody the principle of flexing a torque resisting beam to provide the desired reading; however, better results have been found possible in torsion type wrenches embodying teachings of the present invention.

In accordance with the teachings of the present invention, the torsion measuring principle has been embodied in the conventional type lever-arm wrench with minimum friction, lag, free-play, and maximum translation of the relative twist of the load carrying member. This has been accomplished in conjunction with presetting torque load indicator instrumentalities which preclude errors and variations in reading and interpreting the usual indicators in all conditions of use. Torque measurements are possible, therefore, with a negligible error factor and nut turning operations are accurately measured under all conditions and capacities irrespective of human error and the position of applied force along the lever-arm for effecting the turning operation.

It has been found in actual use of torque wrenches, that the attendant may not be too observant of the indicator dial or he may be working in such an obscure or inconvenient position for the purpose of nut turning with difficulty in normally inaccessible places so that there is little opportunity to read the dial and, therefore, the user of a torque wrench may not be in the position to determine with any great deal of accuracy the torque load that is being applied. Furthermore, human error may render otherwise accurate torque measuring instrumentalities ineffectual so that the present invention contemplates the elimination of human error and the other noted difficulties by providing visual as well as physical signals that will convey to the attendant the knowledge that the applied torque has reached the predetermined value at which the measuring instrumentalities have been pre-set prior to the application of the wrench. To this end, it has been found desirable to provide audible, visual and physical indicators so that there would be no possible chance of the attendant to apply more torque load to a fastener than is initially intended.

The physical indicator may take the form of a releasable expedient which will provide a slight impact against the person of the attendant such as his hand which is being used for the application of nut turning force. With such an expedient, it would be impossible for the attendant to continue applying a torque load after receiving the physical signal that is controlled by the pre-setting expedients. This would be true irrespective of the position in which the attendant was using the torque wrench or the inaccessibility of use which may preclude the direct vision to the calibrated indicator or measuring meter that has heretofore been used in devices of this character. These human failures have been entirely eliminated by utilizing a combination of indicators that are actuated by the pre-setting instrumentalities when the torque load reaches the measurement for which the wrench is preset.

One object of the present invention is to simplify the construction and improve the operation of devices of the character mentioned.

Another object is to provide a simple and compact torque measuring wrench of the lever-arm type that is accurate, dependable in operation, and embodies presetting control means for accurately indicating the tightening load.

Still another object is to provide a torque measuring turning tool having improved torsion translating means associated therewith in conjunction with presetting indicator instrumentalities which provide visual, physical and audible signals for indicating the torque applied in the turning operation at a preset value.

A further object is to provide a torque measuring turning tool with instrumentalities for operating a trigger release indicator at any predetermined torque load.

A still further object is to provide a torque wrench with a turning shank having trigger release presetting indicator means to control the extent to which any fastener may be tightened by giving the attendant a physical impulse.

Still a further object is to provide a wrench having a rigid casing element for attachment of a turning shank subjected to turning movement to provide a calibrated torque load in conjunction with presetting measuring control instrumentalities embodying visual, audible, and physical indicator expedients to limit the further application of force by the attendant.

An additional object is to provide an improved preset releasable impacting signal means in torque wrenches to indicate to the attendant that the torque load has reached a preset value.

Other objects and advantages will appear from the following description of an illustrative embodiment of the present invention.

In the drawings:

Figure 1 is a plan view of a wrench embodying features of the present invention.

Figure 2 is a side view in elevation of the wrench shown in Figure 1.

Figure 3 is a bottom plan view of the wrench shown in Figure 1.

Figure 4 is a sectional view taken substantially along line IV—IV of Figure 3.

Figure 5 is a sectional view taken substantially along line V—V of Figure 1.

Figure 6 is a sectional view taken substantially along line VI—VI of Figure 1.

Figure 7 is a plan view of an underside of a casing cover plate and its assembled instrumentalities.

Figure 8 is a sectional view taken substantially along line VIII—VIII of Figure 6.

Figure 9 is a sectional view in elevation taken substantially along line IX—IX of Figure 6.

Figure 10 is a sectional view in elevation taken substantially along line X—X of Figure 6.

Figure 11 is a sectional view taken along line XI—XI of Figure 7.

Figure 12 is a plan view of another embodiment of the present invention.

Figure 13 is a view similar to Figure 12 with the top casing plate removed to show the casing interior and instrumentalities confined therein.

Figure 14 is a sectional view in elevation taken substantially along line XIV—XIV of Figure 13.

Figure 15 is a sectional view in elevation taken substantially along line XV—XV of Figure 13.

Figure 16 is a sectional view in elevation taken substantially along line XVI—XVI of Figure 13.

Figure 17 is a bottom plan view of the presetting calibrated dial shown assembled in top plan in Figure 12.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a solid handle member 10 of standard construction having an elongated chambered wrench shank or body 11 cast or otherwise shaped to present inclined side walls 12 and 13 terminating in a semi-circular top or head extremity 14. The handle 10 with its chambered body 11 is preferably though not essentially cast from an aluminum alloy so as to possess the desired strength and lightness for convenience and manipulation in nut turning as will appear more fully hereinafter. It will be observed that the handle shank or body 11 consists of the inclined side walls 12—13 which converge in the direction of the handle 10 and also toward the bottom wall 15 formed integral therewith to define an elongated chambered interior 16. It should be noted that, in this instance, the side walls 12—13 not only converge toward the handle 10 (Figures 1 and 9) but also toward the bottom 15 (Figures 3 and 9) to define a compact and well balanced casing or body 11.

The body or casing shank 11 is, in this instance, covered by a rigid steel plate 17 that is shaped to conform with the configuration of the peripherally flanged open side 18 opposite the bottom wall 15 to confront therewith and serve as a complement thereof. The lower or handle extremity 19 of the chamber 18 is of the same general semi-circular configuration as the head extremity 14. The peripherally flanged open edge 18 of the casing 11 extends around the side walls 12—13 and their semi-circular head and handle extremities 14 and 19. The rigid face or cover plate 17 is shaped to correspond with the flanged open edge 18 including its upper and lower semi-circular head and handle extremities 14 and 19 to serve as an enclosure therefor and a rigid turning arm to which the measuring instrumentalities are attached as well appear more fully hereinafter.

A plurality of threaded screw fasteners 20 project through apertures 21 in the rigid cover plate 17 to engage correspondingly threaded bores 22 in the peripheral casing edge 18 that extends along the side walls 12—13 of the handle shank or casing body 11 and semi-circular ends 14—19, thereby enclosing the chamber 16 and confining the torsion displacing, indicating, and measuring instrumentalities to be described hereinafter. It will be noted that the handle shank or casing body 11 and especially the inclined side walls 12—13 are reinforced in the region of the threaded bores 22 by increasing the thickness of the case peripheral flange 18 as at 23—24, 25—26, and 27—28 so that the comparatively rigid and load carrying cover plate 17 can be effectively attached to the casing body 11 which is greatly strengthened and reinforced therewith.

In fact, the casing 11 does not sustain any appreciable turning load and primarily serves to confine the measuring instrumentalities as a protection against foreign substances and impacts.

The cover plate 17 is sufficiently rigid to avoid a flex, distortion or consequential variation under turning load. The semi-circular head 14 of the body 11 is provided with a circular recess 29 corresponding substantially in curvature therewith and sized to receive a revoluble turning member 30 of substantially corresponding size for free rotation therein. The revoluble turning member 30 has an annular shoulder 31 formed, in this instance, integral therewith immediately above a polygonal wrench socket receiving extremity 32 which terminates beyond the bottom 15 of the casing shank 11 for projecting through the circular recess 29 provided in the head 14. A spring impelled detent 33 of standard construction is provided in a face of the polygonal shank 32 for cooperation with a correspondingly sized and shaped recess provided in a wrench socket or other turning implement that is telescoped thereon for retention thereon against accidental detachment.

Wrench sockets or other turning implements (not shown) would normally be provided with a recessed shank shaped and sized to conform with the polygonal extremity 32 of the revoluble turning member 30 so that the friction exerted by the spring impelled detent 33 would be effective in retaining the turning implement thereon against accidental removal. As shown, the revoluble member 30 has a cylindrical extension 34 constituting a turning shank which, in this instance, is formed integral with the annular shoulder 31 and polygonal shank 32 in axial relation therewith. The cylindrical turning shank 34 terminates in an enlarged polygonal flange 35 having, in this instance, a circular configuration which may be of any polygonal shape depending upon the dictates of commercial practice. So that the revoluble turning member 30 may be attached to the cover plate 17 to constitute a fixed element thereof, the cover plate 17 and the flange 35 of the revoluble turning member 30 are welded together in a manner known in the art to anchor the turning member 30 rigidly thereto against any relative movement at their juncture.

It should be noted that the revoluble turning member 30 is rigidly attached to the cover plate 17 that is preferably of rigid and non-yielding material such as steel while the body or casing shank 11 may be cast or otherwise shaped from aluminum in that the revoluble turning member 30 is mounted for movement relative thereto in sustaining the turning load. The casing 11 does not directly carry any appreciable load. Turning movement is imparted to a fastener such as a threaded nut through a wrench socket attached to the polygonal shank 32 of the revoluble turning member 30, responsive to manually applying force or effort to the handle 10 in one direction or another.

In order to measure the extent to which any fastener such as a threaded nut is applied through the manipulation of the handle 10, the extent of twist sustained by the cylindrical extension 34 of the revoluble turning member 30 is determined in that this will be uniform for any predetermined applied force and will vary proportionately to the turning load imparted through the handle 10 that is primarily sustained by the rigid cover plate 17. It will be observed that owing to the rigid anchored attachment of the turning shank 30 to the cover plate 17 through the medium of the flange 35, any turning movement applied to the handle 10 will be transferred to the cover plate 17 which, in turn, will rotarily displace the turning shank member 30 which carries a nut or other turning implement to the end that proportional twist is imparted to the cylindrical extension 34 anchored to the cover plate 17 at one extremity 35 and free to twist at the other extremity 32 responsive to carrying the turning load.

In order to measure the degree of twist or torsion imparted to the cylindrical extension 34 of the revoluble member 30 responsive to any turning displacement or operation, an elongated tapered indicator displacing rod 36, is in this instance of rectangular cross-section, and projects radially in the annular shoulder 31 of the revoluble member 30 as at 37 for fixed engagement to constitute a single acting unit or member therewith. The elongated rod 36 projects longitudinally of the body or casing shank 11 for confinement therein. So that the casing shank 11 together with its associated instrumentalities may be as compact as possible, the indicator displacing rod 36 is preferably disposed parallel to the casing bottom 15 (Figure 6) to avoid contact with either the bottom 15 or cover plate 17 and be completely free to circumferentially move or oscillate for a limited extent depending upon the degree of twist imparted to the revoluble member extension 34 or the tortion effect therein responsive to carrying the turning load imparted to the fastener that is engaged through an appropriate adapter detachably associated with the shank 32.

The elongated indicator displacing rod 36 need only be heavy enough to overcome the friction in the measuring instrumentalities and the load occasioned by their operation without causing any flex in the rod 36. Its cross-sectional size, however, may be determined by other factors such as the elimination of backlash and conditions of abuse in actual nut turning operations. For that reason, the elongated rod 36 in actual practice may be appreciably heavier than otherwise required merely to carry a comparatively negligible load of operating the measuring instrumentalities without any flex in the rod 36 which is merely a translating medium as will appear more fully from a description of the calibrated indicator instrumentalities.

It may be more desirable from a manufacturing standpoint to terminate the elongated rod 36 short of the lower handle end 19 of the casing 11 or cover plate 17 and join therewith a rod extension 37 of comparatively smaller diameter. To this end, the rod extension 37 has its upper extremity 38 projecting within an axial bore 39 provided in the lower extremity of the rod 36. The upper extremity 37 of the rod extension 38 is frictionally engaged by press-fitting or otherwise attached in the bore 39 by any suitable means as commercial practice may dictate to effect rigid connection of the rod extension 37 with the elongated actuating rod 36 for cooperation with the measuring instrumentalities (Figures 6 to 9). The lower region of the rod extension 37 is milled or otherwise shaped to provide a flat side 40 and a precision finished flat edge 41 to confront the indicating instrumentalities to be hereinafter described.

The detachable rod extension 37 enables the replacement thereof should occasion demand or should such become impaired in any nut turning operation. It should be noted that the rod 36 together with its reduced extension 37 functions exactly the same even though these were turned or otherwise shaped to constitute an integral unit; however, such construction would be somewhat more expensive from a production standpoint than the co-axial connected rods 36—37 serving as an actuator for measuring instrumentalities when displaced by the twist imparted to the turning member shank 34. The reduced rod extension 37 projects longitudinally within the casing body chamber 16 near the bottom end 19 thereof for cooperation with improved measuring and indicating instrumentalities to be presently described.

The measuring and indicating instrumentalities comprise, in this instance, pre-set control means for enabling a nut or other fastener to be turned tight to a predetermined torque which is usually measured in foot-pounds, although in smaller capacities the measurement may be in inch-pounds. Whatever the scale, however, a trigger mechanism is provided to be released upon turning a nut or other fastener with a predetermined torque load at which time there is a change in the position of the indicator. The degree of twist in the revoluble member shank 34 will serve to displace the rod extension 37 for a proportional extent, and it is this arcuate displacement at a given point which is, in effect, measured. To this end, the flat precision edge 41 of the rod extension 37 confronts a trigger 42 comprising an elongated rectangular member that depends in confronting relation with the flat edge 41 of the rod extension 37. The trigger 42 is pivoted as at 43 to a block 44. The block 44 is fixed to a comparatively thin plate 45 that is pivoted as at 46 proximate to one extremity 47 thereof, to the underside of the cover plate 17 (Figures 6 and 7).

As shown, the trigger 42 has a protruding shoulder 48 which is pivotally movable therewith within a slot 49 provided in the block 44 to present the shoulder 48 in the path of a rod or plunger 50. The rod or plunger 50 is reciprocally mounted in an upraised boss 51 extending from the block 44. The upraised boss 51 projects through a laterally extending slot 52 provided in the cover plate 17 to permit restricted lateral displacement thereof along with the plate 45 to which it is attached. As shown, the reciprocable rod or plunger 50 terminates in a flat head 53 (Figures 9 and 11) to confront the flat side 49 of the rod extension 37. In order to normally urge the rod or plunger 50 in an outwardly direction relative to the cover plate 17, a spring 54 is provided in enveloping relation therewith for confinement in an axial bore 55 provided in the upraised boss 51 of the block 44. A stop in the form of a threaded disc member 56 adjustably engages the threaded projecting extremity 57 of the plunger 50 in order to confine the spring 54 within the bore 55 and to normally urge the plunger 50 outwardly with its lower flat head 53 projecting against the trigger shoulder 48.

A flat spring 58, in this instance of substantially U-shaped configuration, is fixed to the block 44 by means of fasteners 59—60 to confront the trigger 42 and normally urge the shoulder 48 in the path of the plunger head 53 to engage therewith and retain the plunger 50 inwardly to its extreme position of displacement against the urge of the spring 54. In this position, the plunger head 53 will ride along the incline edge 61 of the trigger shoulder 48 and engage therebeneath for retention in this extreme position. A threaded nut or other suitable fastener 62 engages the correspondingly threaded cylindrical extension 63 of the upraised boss 51 to enable the latter to be retained against lateral displacement in any position within the limits of the slot 52.

This will preclude the oscillatable shifting of the block mounting plate 45 relative to its pivot 46.

This is desirable whenever the pre-setting mechanism is at a predetermined torque load value at which there is to be a repeated number of fastener tightening operations. This is effective in production operations where an attendant is performing the same operation on different devices for any given period. Now, then, the position of the plate 45 with respect to the pre-setting control instrumentalities, will determine the torque load at which the plunger 50 will be released by reason of the rod extension 37 abutting against the trigger 42 to displace the shoulder 48 from the path of the plunger head 53. To this end, the pre-setting mechanism comprises a calibrated dial 64 which is fixed to a finger manipulating knob 65 that adjustably engages a stud shaft 66 (Figures 1 and 6). The dial 64 with its knob 65 is fixed to the stud shaft 66 exteriorly of the cover plate 17. The inner end of the stud shaft 66 has a cam 67 fixed thereto which is rotatable with the dial 64 in the path of a straight shoulder 68 formed on an extension 69 of the plate 45.

The cam 67 has a progressive edge that shifts the plate extension 69 laterally relative to its pivot 46 for distances commensurate with the torque load calibrations provided on the dial 64 so that a corresponding turning load will impart a twist to the load carrying shank 34 that in turn will translate the rod 36 with its extension 37 in the direction of the trigger 42 to effect the release of the plunger 50 and thus visually indicate to the attendant that the pre-set load for which the dial 64 has been rotatably adjusted, has been reached. Thereupon, the attendant will manually release the force with which the handle 10 is being displaced for accomplishing the fastener tightening operation. As shown, a stop in the form of a pin 70 protrudes inwardly from the cover plate 17 to enable the cam 67 to be turned to its maximum extent in a counter-clockwise direction (viewed from Figure 7) so that it will be impossible to turn the dial 64 in only a single direction for effecting the pre-setting thereof. Thereupon, the dial 64 through its knob 65 will have to be reversed rather than permit the complete rotation thereof to arrive at the desired pre-setting position or positions.

In order to maintain the shoulder 68 on the plate extension 69 in constant contact with the cam 67, a coil spring 71 is anchored as at 72 to the extremity 73 of the plate extension 69 while the other end thereof is anchored as at 74 to the underside of the cover plate 17. This precludes any free movement of the pre-setting mechanism and will insure the displacement of the plate extension 69 with its trigger mechanism 42 to correspond with the calibrated indications in foot-pounds or inch-pounds on the dial 64.

It will be apparent, therefore, that in the event the attendant is called upon to tighten a fastener to a load value within the calibrations provided on the dial 64, the latter is rotated so that the selected torque load on the dial 64 corresponds and aligns with a suitable orienting line such as the arrow 75 which would be impressed or inscribed on the cover plate 17 in confronting relation with the dial 64 disposed thereon. When this load value is imparted to a fastener such as a nut, the plunger 50 which was initially depressed would become released and indicate to the attendant that he is to stop applying any further force, release the force that has been applied, and then remove the turning tool from the fastener. If the attendant is engaged in tightening fasteners calling for the same torque turning loads for any given period, the threaded knob 62 is tightened to preclude any accidental displacement of the dial 64. This will insure the same reading at which the trigger 42 will release the plunger 50 and notify the attendant that the desired torque turning load has been reached.

In order to further insure that the attendant will be notified of the release of the plunger 50 under all conditions of illumination and even though the attendant may be working in a very restricted or uncomfortable position, an audible or visual signal can also be provided to operate in conjunction with the trigger 42 and the plunger 50 released thereby. In the present embodiment, a visual indicator has been provided in the form of an electric bulb 76 that is threaded into a socket 77 carried by an elongated casing 78 which preferably is fixed to the exterior of the cover plate 17 by any suitable means such as the threaded fasteners 79—80. A battery 81 is confined in the casing 78 to energize the bulb 76 whenever the plunger 50 has been released. A transparent lens 82 fits over the end of the battery casing 78 to permit the light rays to emanate from the bulb 76.

As shown, the battery casing 78 is preferably of metal such as aluminum which is grounded by contact with the cover plate 17. This grounds one pole of the battery 81 while the other pole thereof is operatively connected to a plunger stop pin 83 (Figure 9) that is insulated in the trigger body or block 44. To this end, the stop pin 83 is carried in an insulator bushing 84 that projects through one side of the trigger body or block 44 to support the inward extremity of the pin 83 in the path of the plunger head 53. A wire 85 connects the insulated bulb socket 77 with the insulated pin 83 to complete the circuit to the battery 81 whenever the plunger head 53 is released to strike the pin 83 serving as a stop therefor.

Consequently, whenever the plunger 50 is released by the trigger 42, the bulb 76 will be energized to provide a visual signal in conjunction with the released position of the plunger 50. It should be noted, also, that the release of the plunger 50 provides an audible click by reason of the impact of the plunger head 53 against the extremity of the pins or stop 83 so that the use of the visual indicator bulb 76 is not absolutely essential. The visual illuminator 76 is optional and would prove effective only as an additional precaution against the inadvertance that may be indulged in by users or whenever they are utilizing the torque wrench in restricted situations where full observation is not always possible.

It will be apparent from the foregoing arrangement of parts that a manual turning force applied to the handle 10 will impart a corresponding turning effect to the revoluble turning member 30. This creates a slight twist in the turning member extension or shank 34 which can be measured with the advantage procured through the moment arm displacing member 36 therebetween. This turning operation is transmitted to a suitable fastener or tool or implement or fastener such as a threaded nut which requires a predetermined turning load in securing it to the desired degree of tightness for the suitable performance of its intended function.

This turning movement and sustained turning load will create a fractional twist in the revoluble member shank or extension 34 between its annular shoulder 31 and the stationary flange 35. This fractional twist created by the torsional effect on the cylindrical extension 34, will be translated to the measuring instrumentalities culminating in the arcuate displacement of the rod extension 37 relative to the setting of the trigger 42 through the presetting of the calibrated dial 64 relative to the elongated rod 36—37. The degree of twist or torsional strain within the turning member shank 34 is measured at the extreme end of the elongated rod 36—37 which is the point of its greatest displacement relative to the trigger 42 which releases the plunger rod 50 and illuminates the visual signal 76.

As a result, the rod 36—37 will accentuate the twist created in the revoluble head extension 34 to translate this twist arcuately to an extent proportional to the length of the elongated rod 36—37. The measurement of the twist imparted to the revoluble head extension 34 at a point of maximum displacement of the comparatively long twist-translating rod 36—37 is an important factor in producing accurate release of the trigger 42. Then, too, the rod 36—37 need only be heavy enough to overcome the comparatively negligible force required to actuate or release the measuring instrumentalities so that comparatively little friction is encountered between the revoluble turning member 30 and the measuring instrumentalities. This is conducive to accuracy accomplished with utmost simplicity in construction and operation.

The presetting of the calibrated dial 64 and the release of the plunger 50 with or without the visual indicator 76, precludes errors in reading the usual dials during turning operation thereof and affords an effective and definite stop at which the attendant must release the force of turning as there are no further determinations possible until the next turning operation is encountered and the plunger 50 is depressed to its initial operative position. If a different turning load is required for the next operation, the dial 64 is again preset relative to the arrow 75, and the operation is repeated. This enables resetting of the dial indicator 64 relative to the pointer 75 prior to applying a wrench to an instrumentality that is to be turned therewith. Any abrupt release of the nut turning load or the actuation of the trigger 42 to release the plunger 50, will not shock the sensitive measuring instrumentalities as in the case of directly connected indicating meters such as used in conjunction with known torque wrenches. While there are different forms of automatic release mechanisms on some types of known torque wrenches, these jar the sensitive instrumentalities, create abnormal wear and back lash, and have not proven entirely satisfactory.

With the teachings of the present invention, there is no automatic or sudden release of any load sustaining instrumentality and only the indicator is actuated at the moment the turning load reaches the preset value. The wrench is then gradually and manually released from its turning load. Then, too, the torsional displacement in a torsion-type wrench embodying a comparatively short load turning shank 34 is comparatively small in that the degree of twist therein would be a minute amount approximating five thousandths of an inch under normal loads. Because the elongated rod 36—37 does not actually displace any sensitive dial mechanism at its free end or point of maximum displacement, this minute torsional displacement of the load carrying shank 34 is appreciably translated and accentuated at the trigger releasing end of the actuator rod 36—37. Even though there was an abrupt release of load, therefore, the backlash in the aforesaid structure would be negligible and the actuator rod 36—37 would not be called upon to withstand any appreciable backlash shock which would not, however, be absorbed by any sensitive dial indicator mechanism as none is actually connected therewith.

In the modified embodiment shown in Figures 12 to 17 inclusive, the structure is simplified and further improved by providing a physical indicator by placing the trigger release in a position where it will impact against the finger or thumb of the hand that is applied to the handle during the turning movements of the wrench. This entails the same handle member 10' which, in this instance, is slightly offset from the elongated chambered wrench shank or body 11' to present an end wall 15' proximate to the handle 10' at its line of integral joinder with the casing 11'. With this arrangement, the revoluble turning member 30' is joined with an elongated indicator displacing rod 36' that is slightly offset toward the cover plate 17' to provide a free terminal portion 37' that is of somewhat reduced width to confront a trigger 42'.

The trigger 42' is pivoted as at 43' to a block 44'. The block 44' is fixed to a comparatively thin plate 45' that is pivoted as at 46' proximate to one end 47' thereof which is nearest the handle 10'. The comparatively thin plate 45' is pivoted as at 46' to the underside of the cover plate 17' (see Figure 14). The trigger 42' has a protruding shoulder 48' which is pivotally movable therewith within a slot 49' provided in the block 44' to present the shoulder 48' in the path of a rod or plunger 50'. The rod or plunger 50' is reciprocally mounted in a bore 51' provided longitudinally through the block 44' (Figure 13) for communication with recessed openings 52'—53' provided in the ends of the block 44'. The end block recess 52' communicates with the slot 49' so that the trigger shoulder 48' will be disposable adjacent and in contact with the rod or plunger 50'.

As shown, the rod or plunger 50' has enlarged heads 43'—55' at both ends thereof with the latter extending through an opening 56' provided in the bottom end 15' of the casing 11' adjacent to the position that would be occupied by the fingers of the attendant's hand which grasp the handle 10. A compressible coil spring 57' envelops the rod or plunger 50' between the block recess 51' and the lower enlarged head 55' of the rod or plunger 50' to normally urge the latter outwardly or downwardly in the direction of the handle 10' unless retained in a preset downwardly displaced position against the urge of the spring 57' by the shoulder 48' of the trigger 42'. In this position, the trigger shoulder 48' engages beneath the enlarged inward head 54' of the rod or plunger 50' to retain the latter in its preset or cocked position against the urge of the spring 57' and with the other enlarged head 55' thereof out of contact with any portion of the attendant's hand which grasps the handle 10'.

A flat spring 58' is fixed to the block 44' by means of suitable fasteners 59' to confront the trigger 42' and normally urge the shoulder 48' thereof in the path of the plunger head 54' to engage thereunder as it is manually displaced therebeyond in the presetting operation and thus retain the plunger 50' inwardly to its extreme position of displacement against the urge of the spring 57'. In this position, the curved outward surface of the plunger head 54' will ride over the trigger shoulder 48' and the latter will engage therebeneath for retention in this extreme position. The release of the plunger 50' is effected by displacement of the actuating rod 36' against the trigger 42'. So that there may be some adjustment to properly calibrate the wrench at the factory prior to its delivery, the reduced end 37' of the elongated actuating rod 36' abuts against an arcuate detent 60' that is part of a furcated bracket 61' which extends over the end of the trigger 42'.

The end region of the trigger 42' is provided with a plurality of teeth or serrations 62' which mesh with the extremities of the arcuate detent 60' for retention in any position along the limits of the trigger teeth 62'. A spring 63' engages beneath a pin 64' that straddles the furcations of the brackets 61' to normally urge the extremities of the arcuate detent 60' in meshing engagement with the trigger teeth 62'. Consequently, the furcated bracket 61' can be depressed against the trigger 48' to disengage the arcuate detent 60' from the trigger teeth 62' and thus permit the displacement of the detent 60' along the trigger 42' for the extent of the trigger teeth 62'. This will provide for the desired adjustment at the factory in order to calibrate the instrument to accurately correspond with torque load calibrations 65' in inch pounds, foot pounds or any other standard of measurement provided on a circular dial 66' which is positioned on the outside of the cover plate 17'.

The calibrated dial 66' is mounted on a stud shaft 67' exteriorly of the cover plate 17' with the inner end thereof projecting through the cover plate 17' to terminate within the casing 11'. The inner end of the dial mounting shaft 67' has a cam 68' fixed thereto for rotation with the dial 66' in the path of a straight shoulder surface 69' formed on an extension 70' of the pivoted plate 45' to which the trigger mounting block 44' is attached for oscillatable movement therewith. The cam 68' has a progressive edge that shifts the plate extension 70' laterally relative to its pivot 46' for distances commensurate with the torque load calibrations 65' provided on the dial 66'.

Consequently, a corresponding turning load will impart a twist to the load carrying shank 34' that in turn will translate the rod 36' with its lower extremity 37' in the direction of the trigger 42' to effect the release of the plunger 50' to thus visually and physically indicate by impact against the attendant's hand that a preset load for which the dial 66' has been preset, has been reached. Thereupon, the attendant will manually release the force with which the handle 10' is being displaced for accomplishing the nut or other fastener tightening operation. It should be observed that the position of the plate 45' with respect to the presetting control instrumentalities, will determine the torque load at which the plunger 50' will be released by reason of the rod extremity 37' abutting against the trigger 42' to displace its shoulder 48' from the path of the plunger head 54'.

To the end of maintaining the calibrated dial 66' in its preset position against any possible accidental displacement during use of the wrench, the underside of the dial 66' is provided with a plurality of circumferentially spaced recesses 71'

(Figure 17) which correspond to the calibrations 65' on the exterior surface thereof to cooperate with a spring impelled ball detent 72' mounted in the cover plate 17' (Figure 14). The spring impelled ball detent 72' will be urged in the path of the circumferentially spaced recesses 71' in the underside of the dial 66' to thus retain the preset position thereof. It will be observed, therefore, that the plunger release 50' will not only provide a physical signal to the attendant by impact against his hand, but the abrupt release will provide a click that serves as an audible signal as well.

The position of the released plunger 50' also serves as a visual indicator which in conjunction with an energized light attachment 78 as shown in the preceding embodiment in Figures 1, 2 and 6, there are indicators provided that respond to three human senses, namely visual, audible, and physical to preclude the attendant overlooking and ceasing to apply further force after the preset torque load has been reached. To insure that the attendant will hold the handle 10' in a position where it will be impacted by the release of the plunger 50' and its head 55', a finger engaging protrusion 73' is provided on the handle 10' so that the attendant will always grasp the latter with his finger abutting against the handle protrusion 73'. It should be understood that the electric light indicator 78 shown in the preceding embodiment may be attached with equal facility to the embodiment shown in Figures 12 to 17 inclusive and exactly as set forth and described in connection with the embodiments shown in Figures 1, 2 and 6.

With the arrangement of parts above described, it will be apparent that a very simple, inexpensive and highly accurate torque measuring wrench has been provided wherein there are few moving parts and mechanical friction has been reduced to a minimum to preclude variable and inaccurate readings. These features coupled with the fact that the torsional stress created by the turning load is measured at the point of maximum displacement of the elongated dial mechanism actuator rod, eliminates or reduces to a negligible minimum any inaccuracies even at small loads. The provision of novel and simple presetting instrumentalities which set off visual, audible, and physical responses in the attendant at preset torque loads, is a distinct improvement and advance in rendering such devices more readily accurate and to eliminate human error to the maximum. The release of the presetting means rather than directly actuating a calibrated meter, affords greater accuracy and minimum impairment to sensitive instrumentalities.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a torque wrench, the combination with an elongated handle member, of a torque responsive work engaging head member operatively associated in torque transmitting relation with one extremity of said handle member, an elongated rod anchored at one extremity to said head member and extending along said handle member for displacement in proportion to the torque turning load on said work engaging head member, calibrated means for presetting to a predetermined torque load value, a releasable adjustable indicator for initial positioning to indicate that the torque load is below the preset value and for projected positioning upon release when the torque load reaches the preset value, retainer means for holding said indicator in its adjusted position, said retainer means being operatively connected to said calibrated means for positioning responsive thereto in the path of said elongated rod, whereby the displacement of said elongated rod for contact with said retainer means will release said indicator to its initial unadjusted position when the torque load on said work engaging head member corresponds with the presetting of said calibrated means.

2. In a torque wrench, the combination with an elongated handle member, of a torque responsive work engaging head member operatively associated in torque transmitting relation with one extremity of said handle member, an elongated rod anchored at one extremity to said head member and extending along said handle member for displacement in proportion to the torque turning load on said work engaging head member, calibrated means for presetting to a predetermined torque load value, a spring actuated releasable adjustable indicator for initial positioning to indicate that the torque load is below the preset value and for projected positioning upon release when the torque load reaches the preset value, spring biased trigger retainer means for holding said indicator in its adjusted position, said retainer means being operatively connected to said calibrated means for positioning responsive thereto in the path of said elongated rod, whereby the displacement of said elongated rod for contact with said retainer means will release said indicator to its initial unadjusted position when the torque load on said work engaging head member corresponds with the presetting of said calibrated means.

3. In a torque wrench, the combination with an elongated handle member, of a torque responsive work engaging head member operatively associated in torque transmitting relation with one extremity of said handle member, an elongated rod anchored at one extremity to said head member and extending along said handle member for displacement in proportion to the torque turning load on said work engaging member, calibrated means for presetting to a predetermined torque load value, a plate movably associated with said handle means, cam means interposed between said calibrated means and said movable plate to position the latter responsive to adjusting said calibrated means, a displaceable indicator operatively connected with said shiftable plate for initial positioning to indicate that the torque load is below the preset value and for projected positioning upon release when the torque load reaches the preset value, and retainer means for said displaceable indicator on said movable plate in the path of said elongated rod, whereby the displacement of said elongated rod for contact with said retainer means will release said indicator to its initial unadjusted position when the torque load on said work engaging head member corresponds with the presetting of said calibrated means.

4. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means disposable in the path of said translatable means for initial positioning to indicate that the torque load is below the preset value and for projected positioning upon release when the torque load reaches the preset value, and calibrated torque load control means operatively connected with said releasable indicator means to preset the position of the latter relative to said translatable means so that the latter will operate said releasable indicator means when said work engaging head member is subjected to a torque load for which said calibrated means has been preset.

5. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means for initial positioning to indicate that the torque load is below the preset value and for projected positioning upon release when the torque load reaches the preset value, retainer trip means for said releasable indicator means disposable in the path of said translatable means, and calibrated torque load control means operatively connected with said releasable indicator retainer trip means to preset the position of the latter relative to said translatable means so that the latter will operate said releasable indicator means when said work engaging head member is subjected to a torque load for which said calibrated means has been preset.

6. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means, retainer trip means cooperable with said releasable indicator means and disposable in the path of said translatable means, calibrated torque load control means operatively connected with said releasable indicator retainer trip means to preset the position of the latter relative to said translatable means so that the latter will operate said releasable indicator means when said work engaging head member is subjected to a torque load for which said calibrated means has been preset, and spring means for normally urging said retainer trip means to normally engage said indicator means in its extreme position of displacement to indicate that the torque load on said work engaging head member is not commensurate with the preset position of said calibrated torque load control means.

7. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means, retainer trip means cooperable with said releasable indicator means and disposable in the path of said translatable means, calibrated torque load control means operatively connected with said releasable indicator retainer trip means to preset the position of the latter relative to said translatable means so that the latter will operate said releasable indicator means when said work engaging head member is subjected to a torque load for which said calibrated means has been preset, flat spring means for normally urging said retainer trip means to normally engage said indicator means in its extreme position of displacement to indicate that the torque load on said work engaging head member is not commensurate with the preset position of said calibrated torque load control means, and means interposed between said calibrated torque load control means and said retainer trip means to position the latter in the path of said translatable means responsive to the presetting of said calibrated torque load control means.

8. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means, retainer trip means cooperable with said releasable indicator means and disposable in the path of said translatable means, calibrated torque load control means operatively connected with said releasable indicator retainer trip means to preset the position of the latter relative to said translatable means so that the latter will operate said releasable indicator means when said work engaging head member is subjected to a torque load for which said calibrated means has been preset, flat spring means for normally urging said retainer trip means to normally engage said indicator means in its extreme position of displacement to indicate that the torque load on said work engaging head member is not commensurate with the preset position of said calibrated torque load control means, means for normally urging said releasable indicator and retainer trip means toward said translatable means, and means interposed between said calibrated torque load control means and said retainer trip means to position the latter in the path of said translatable means in a direction opposite to the displacement urge of said last named means responsive to the presetting of said calibrated torque load control means.

9. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, releasable indicator means, retainer trip means cooperable with said releasible indicator means and disposable in the path of said translatable means, calibrated torque load control means operatively connected with said releasable indicator retainer trip means to preset the position of the latter relative to said translatable means so that the latter will operate said releasable indicator means when said work engaging head member is subjected to a torque load for which said calibrated means has been preset, flat spring means for normally urging said retainer trip means to normally engage said indicator means in its extreme position of displacement to indicate that the torque load on said work engaging head member is not commensurate with the preset position of said calibrated torque load control means, spring means for normally urging said releasable indicator and retainer trip means toward said translatable means, and cam means interposed between said calibrated torque load control means and said retainer trip means to position the latter in the path of said translatable means in a direction opposite to the displacement urge of said last named means responsive to the presetting of said calibrated torque load control means.

10. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate movably mounted to said handle member, releasible indicator means on said plate and disposable therewith in the path of said translatable means, said releasable indicator means having two extreme positions of adjustment for initial positioning to indicate that the torque load is below a preset value and for projected positioning when the torque load reaches a preset value, spring means for urging said plate toward said translatable means, and calibrated torque load control means operatively connected with said releasable indicator means to preset the position of said movably mounted plate relative to said translatable means so that the latter will operate said releasable indicator means when said work engaging head member is subjected to a torque load for which said calibrated means has been preset.

11. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate pivotally mounted to said handle member, releasable indicator means on said plate and disposable therewith in the path of said translatable means, said releasable indicator means having two extreme positions of adjustment for initial positioning to indicate that the torque load is below a preset value and for projected positioning when the torque load reaches a preset value, spring means for urging said plate toward said translatable means, and calibrated torque load control means operatively connected with said releasable indicator means to preset the position of said pivotally mounted plate relative to said translatable means so that the latter will operate said releasable indicator means when said work engaging head member is subjected to a torque load for which said calibrated means has been preset.

12. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate pivotally mounted to said handle member, spring means for urging said plate toward said translatable means, cam means for displacing said plate against the urge of said spring means to accurately space said plate from said translatable means, releasable indicator means on said plate and disposable therewith in the path of said translatable means, said releasable indicator means having two extreme positions of adjustment for initial positioning to indicate that the torque load is below a preset value and for projected positioning when the torque load reaches a preset value, and calibrated torque load control means operatively connected with said releasable indicator means to preset the position of said pivotally mounted plate relative to said translatable means so that the latter will operate said releasable indicator means when said work engaging head member is subjected to a torque load for which said calibrated means has been preset.

13. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate pivotally mounted to said handle member, releasable indicator means on said plate and disposable therewith in the path of said translatable means, said releasable indicator means being mounted for projection proximate to said handle member to impinge in its released position against the turning force applying hand grasping said handle member, spring means for urging said plate toward said translatable means, and calibrated torque load control means operatively connected with said releasable indicator means to preset the position of said pivotally mounted plate relative to said translatable means so that the latter will operate said releasable indicator means when said work engaging head member is subjected to a torque load for which said calibrated means has been preset.

14. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate movably mounted to said handle member, releasable indicator means on said plate and disposable therewith in the path of said translatable means, said releasable indicator means being mounted for projection proximate to said handle member to impinge in its released position against the turning force applying hand grasping said handle member, spring means for urging said plate toward said translatable means, and calibrated torque load control means operatively connected with said releasable indicator means to preset the position of said movably mounted plate relative to said translatable means so that the latter will operate said releasable indicator means when said work engaging head member is subjected to a torque load for which said calibrated means has been preset.

15. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate movably mounted to said handle member, releasable indicator means on said plate and disposable therewith in the path of said translatable means, said releasable indicator means being mounted for projection proximate to said handle member to impinge in its released position against the turning force applying hand grasping said handle member, spring means for urging said plate toward said translatable means, calibrated torque load control means operatively connected with said releasable indicator means to preset the position of said movably mounted plate relative to said translatable means so that the latter will operate said releasable indicator means when said work engaging head member is subjected to a torque load for which said calibrated means has been preset, and means on said calibrated torque load control means to retain its adjusted position against accidental displacement.

16. In a torque wrench, the combination with a handle member, of a torque responsive work engaging head member operatively connected in torque transmitting relation with said handle member and adapted to yield in response to a torque load thereon, translatable means connected with said work engaging head member to move commensurate with the yield imparted thereto by the torque load thereon, a plate movably mounted to said handle member, releasable indicator means on said plate and disposable therewith in the path of said translatable means, said releasable indicator means being mounted for projection proximate to said handle member to impinge in its released position against the turning force applying hand grasping said handle member, spring means for urging said plate toward said translatable means, and calibrated torque load control means operatively connected with said releasable indicator means to preset the position of said movably mounted plate relative to said translatable means so that the latter will operate said releasable indicator means when said work engaging head member is subjected to a torque load for which said calibrated means has been preset, there being indentations on said calibrated torque load control means to correspond with the calibrations thereon, and spring impelled detent means on said handle member to cooperate with said indentations to retain said calibrated torque load control means in its adjusted position against accidental displacement.

17. In a torque wrench, the combination with an elongated handle member, of a manual hand grasping portion on said handle member, a torque responsive work engaging member mounted to said handle member in torque transmitting relation therewith, calibrated torque load presetting means on said handle member for presetting a predetermined torque load value, and a releasable spring actuated indicator mounted in said handle member to project exteriorly thereof in the path of said hand grasping portion for retention and releasable control by said calibrated torque load presetting means, said spring actuated indicator serving as a visual and audible and physical indication when the torque load on said work engaging head member is commensurate with the preset position of said calibrated torque load presetting means.

References Cited in the file of this patent

UNITED STATES PATENTS

| Number | Name | Date |
|---|---|---|
| 1,512,192 | Benko | Oct. 21, 1924 |
| 2,242,613 | Mandl | May 20, 1941 |
| 2,250,941 | Zimmerman | July 29, 1941 |
| 2,289,238 | Brunelle | July 7, 1942 |
| 2,300,652 | Cooney | Nov. 3, 1942 |
| 2,320,023 | Zimmerman | May 25, 1943 |
| 2,343,380 | Larson | Mar. 7, 1944 |
| 2,367,224 | Larson et al. | Jan. 16, 1945 |
| 2,385,591 | Sturtevant | Sept. 25, 1945 |
| 2,442,359 | Hattan | June 1, 1948 |
| 2,553,311 | Greer | May 15, 1951 |

FOREIGN PATENTS

| Number | Country | Date |
|---|---|---|
| 621,277 | France | Jan. 31, 1927 |